United States Patent
Ying et al.

(10) Patent No.: US 9,641,261 B2
(45) Date of Patent: May 2, 2017

(54) WEARABLE WIRELESS ELECTRONIC DEVICES AND METHODS OF PROVIDING COMMUNICATIONS VIA WEARABLE WIRELESS ELECTRONIC DEVICES

(71) Applicant: Sony Corporation, Tokyo (JP)

(72) Inventors: Zhinong Ying, Lund (SE); Kun Zhao, Stockholm (SE)

(73) Assignees: SONY CORPORATION, Tokyo (JP); SONY MOBILE COMMUNICATIONS INC., Tokyo (JP)

(*) Notice: Subject to any disclaimer, the term of this patent is extended or adjusted under 35 U.S.C. 154(b) by 36 days.

(21) Appl. No.: 14/425,910

(22) PCT Filed: May 9, 2014

(86) PCT No.: PCT/JP2014/002472
§ 371 (c)(1),
(2) Date: Mar. 4, 2015

(87) PCT Pub. No.: WO2015/170367
PCT Pub. Date: Nov. 12, 2015

(65) Prior Publication Data
US 2016/0261353 A1     Sep. 8, 2016

(51) Int. Cl.
*H04B 5/00* (2006.01)
*H04B 13/02* (2006.01)
(Continued)

(52) U.S. Cl.
CPC .......... *H04B 13/005* (2013.01); *G06F 1/163* (2013.01); *H04W 4/008* (2013.01)

(58) Field of Classification Search
CPC .................................................. H04B 13/005
(Continued)

(56) References Cited

U.S. PATENT DOCUMENTS 8,606,177 B2 * 12/2013 Hwang ............... H04B 13/005
                                                     340/852
8,684,457 B2 *  4/2014 Kim ...................... H04R 5/023
                                                     297/217.1
(Continued)

FOREIGN PATENT DOCUMENTS

EP       1168678 A1 *  6/2000 ............ H04B 10/13
EP     1 168 678 A1    1/2002

OTHER PUBLICATIONS

Notification of Transmittal of the International Search Report and the Written Opinion of the International Searching Authority, or the Declaration, in corresponding PCT Application No. PCT/JP2014/002472; Date of Mailing: Jan. 30, 2015; 3 Pages.

(Continued)

*Primary Examiner* — Tilahun B Gesesse
(74) *Attorney, Agent, or Firm* — Myers Bigel, P.A.

(57) ABSTRACT

Wearable wireless electronic devices are provided. A wearable wireless electronic device may be a wearable first wireless electronic device that may include a user-wearable transmitter. The user-wearable transmitter may include first and second electrodes that are spaced apart from each other. The first and second electrodes may include first and second curved portions, respectively, when the user-wearable transmitter is worn by a user. Moreover, the first and second electrodes may be configured to transmit communications through a human body of the user to a second wireless electronic device on or adjacent the human body of the user.

20 Claims, 15 Drawing Sheets

(51) Int. Cl.
*H04B 1/00* (2006.01)
*H04B 17/00* (2015.01)
*H04B 13/00* (2006.01)
*G06F 1/16* (2006.01)
*H04W 4/00* (2009.01)

(58) Field of Classification Search
USPC .............................................. 455/41.1, 41.2
See application file for complete search history.

(56) References Cited

U.S. PATENT DOCUMENTS

| | | | |
|---|---|---|---|
| 2006/0252371 A1* | 11/2006 | Yanagida | H04B 13/005 455/41.1 |
| 2009/0124201 A1 | 5/2009 | Meskens | |
| 2009/0149212 A1 | 6/2009 | Kano | |
| 2012/0022341 A1 | 1/2012 | Zdeblick | |
| 2012/0197350 A1 | 8/2012 | Roberts et al. | |

OTHER PUBLICATIONS

International Preliminary Report on Patentability Corresponding to International Application No. PCT/JP2014/002472; Date of Mailing: Nov. 24, 2016; 10 Pages.

* cited by examiner

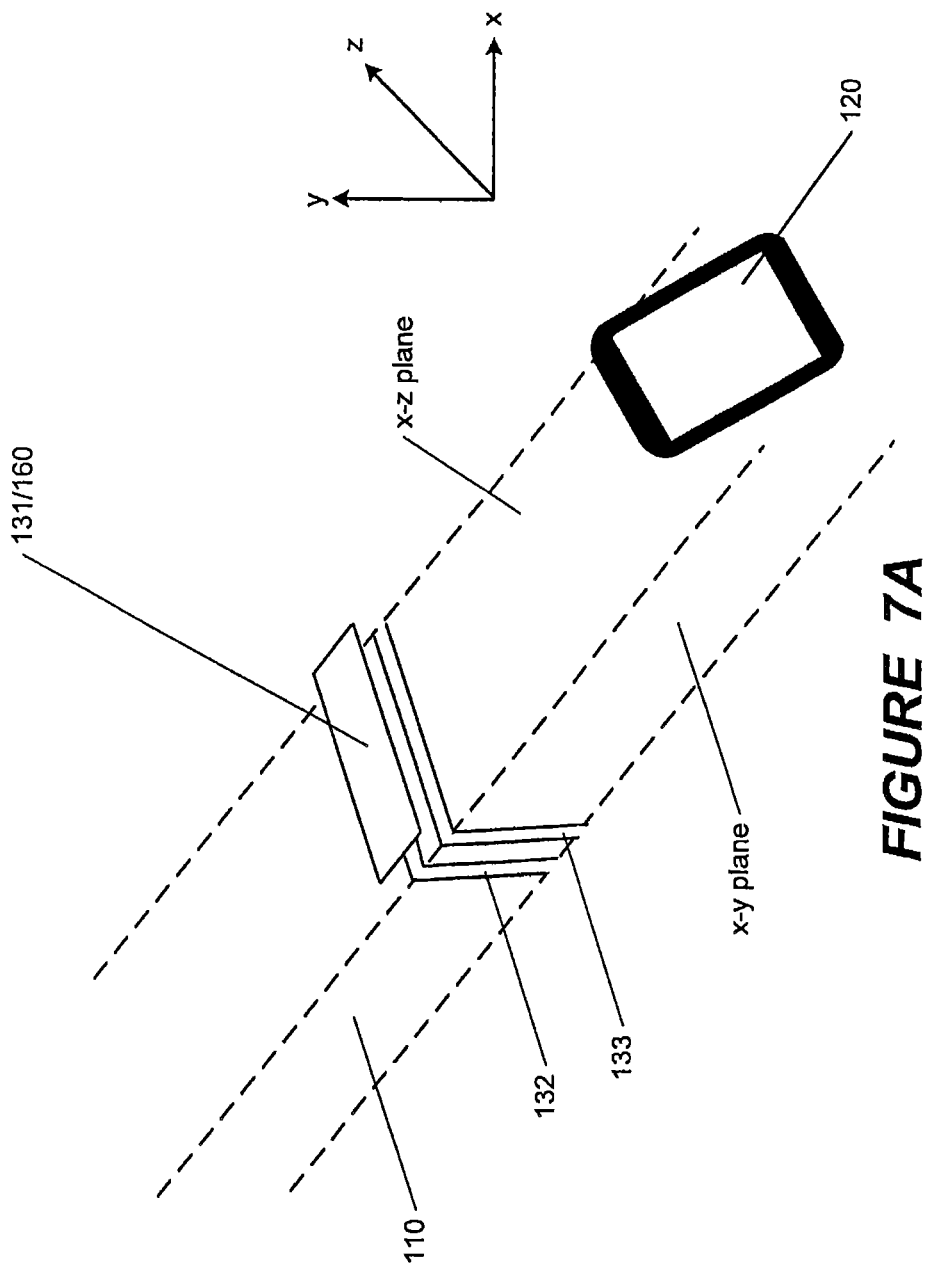

WEARABLE WIRELESS ELECTRONIC DEVICES AND METHODS OF PROVIDING COMMUNICATIONS VIA WEARABLE WIRELESS ELECTRONIC DEVICES

CROSS-REFERENCE TO RELATED APPLICATION

This application is a 35 U.S.C. §371 national stage application of PCT International Application No. PCT/JP2014/002472, filed on 9 May 2014, the disclosure and content of which are hereby incorporated by reference herein as if set forth in their entireties.

TECHNICAL FIELD

The present inventive concepts generally relate to the field of communications and, more particularly, to antennas and wireless electronic devices incorporating the same.

BACKGROUND ART

Wireless communications between wireless electronic devices can be impaired by a human body. For example, when some wireless electronic devices are coupled to a hand or a face of a person, such coupling may harm communications by impairing transmission and/or reception quality. Accordingly, some wireless electronic devices are designed to reduce or compensate for the effects of a human body on wireless communications. Moreover, providing wireless communications through the air may consume significant amounts of power of wireless electronic devices and may have security vulnerabilities.

SUMMARY

Various embodiments of the present inventive concepts include a wearable first wireless electronic device. The wearable first wireless electronic device may include a user-wearable transmitter. The user-wearable transmitter may include first and second electrodes that are spaced apart from each other. The first and second electrodes may include first and second curved portions, respectively, when the user-wearable transmitter is worn by a user. Moreover, the first and second electrodes may be configured to transmit communications via the first and second curved portions through a human body of the user to a second wireless electronic device on or adjacent the human body of the user, when the user-wearable transmitter is worn by the user.

In various embodiments, the first and second electrodes may be configured to transmit the communications through the human body of the user by imposing an electric field on the human body of the user. In some embodiments, the first and second electrodes may be configured to impose the electric field such that the electric field extends along a length of a limb of the human body of the user when the user-wearable transmitter is worn by the user on the limb. Moreover, the limb of the human body of the user may provide a transmission medium along the length of the limb for the communications from the user-wearable transmitter to the second wireless electronic device.

In various embodiments, the first and second electrodes may be first and second partial metal rings, respectively. The first and second partial metal rings may be configured to extend around a majority of a circumference of a limb of the human body of the user when the user-wearable transmitter is worn by the user. Alternatively, the first and second electrodes may be first and second metal rings, respectively, that extend continuously around a circumference of a limb of the human body of the user when the user-wearable transmitter is worn by the user.

According to various embodiments, the user-wearable transmitter may include a conductive plate (e.g., a ground plane of a PCB). The first and second electrodes may be configured to be electrically coupled to the conductive plate. The first and second electrodes may have first and second widths, respectively, that may optionally be narrower than a third width of the conductive plate. Moreover, the first electrode may be electrically shorted to the conductive plate, and the second electrode may be connected to the conductive plate via an antenna feed. In some embodiments, the wearable wireless electronic device may include a matching network that is on the conductive plate and is coupled to at least one of the first and second electrodes.

In various embodiments, the conductive plate may be between the first and second electrodes. In some embodiments, the conductive plate, the first electrode, and the second electrode may include first, second, and third surfaces, respectively, that are substantially coplanar. Moreover, a portion of the first electrode may be immediately adjacent and electrically shorted to the conductive plate, and a portion of the second electrode may be spaced apart from the conductive plate and connected to the conductive plate via an antenna feed.

According to various embodiments, the communications that the first and second electrodes are configured to transmit through the human body of the user wearing the user-wearable transmitter to the second wireless electronic device may be body-coupled communications using frequencies between about 100.0 kilohertz and 100.0 Megahertz. In some embodiments, the wearable first wireless electronic device may include a processor that is configured to measure a communications channel through the human body of the user, and to control modulation of the communications that the first and second electrodes are configured to transmit through the human body of the user, in response to measuring the communications channel of the human body of the user. Moreover, the wearable wireless electronic device may include a transceiver circuit that is on the conductive plate and is configured to electrically couple the conductive plate to the first and second electrodes to transmit the communications.

A wearable first wireless electronic device, according to various embodiments, may include a user-wearable transmitter that includes first and second electrodes that are spaced apart from each other. The first and second electrodes may be configured to extend around at least a majority of a circumference of a limb of a human body of a user when the user-wearable transmitter is worn by the user on the limb. Moreover, the first and second electrodes may be configured to transmit communications through a transmission medium provided by a human body of the user to a second wireless electronic device on or adjacent the human body of the user.

In various embodiments, the user-wearable transmitter may include a conductive surface. The first and second electrodes may be configured to be electrically coupled to the conductive surface. The conductive surface may be a conductive plate, the second wireless electronic device may be a mobile telephone, the first electrode may be electrically shorted to the conductive plate, and the second electrode may be connected to the conductive plate via an antenna feed. Moreover, the communications that the first and second electrodes are configured to transmit through the transmission medium provided by the human body of the user wearing the user-wearable transmitter to the mobile telephone may be body-coupled communications using frequencies between about 100.0 kilohertz and 100.0 Megahertz.

A method of providing body-coupled communications between a wearable first wireless electronic device and a second wireless electronic device, according to various embodiments, may be provided. The method may include transmitting the body-coupled communications from first and second electrodes of a user-wearable transmitter of the wearable first wireless electronic device through a human body of a user to the second wireless electronic device that is on or adjacent the human body of the user, when the user-wearable transmitter is worn by the user. The first and second electrodes may extend around at least a majority of a circumference of a limb of the human body of the user when the user-wearable transmitter is worn by the user on the limb. Moreover, the first and second electrodes may be spaced apart from each other.

In various embodiments, the user-wearable transmitter may include a conductive surface. The first and second electrodes may be configured to be electrically coupled to the conductive surface. The conductive surface may be a conductive plate, the first electrode may be electrically shorted to the conductive plate, the second electrode may be connected to the conductive plate via an antenna feed, and transmitting the body-coupled communications may include transmitting the body-coupled communications through a transmission medium provided by the human body of the user wearing the user-wearable transmitter to the second wireless electronic device using frequencies between about 100.0 kilohertz and 100.0 Megahertz. Moreover, the second wireless electronic device may be a mobile telephone, the limb on which the user-wearable transmitter is worn by the user may be an arm of the user, the mobile telephone may be held by a hand connected to the arm of the user, and transmitting the body-coupled communications may include transmitting the body-coupled communications through the arm on which the user-wearable transmitter is worn by the user to the mobile telephone that is held by the hand connected to the arm.

Other devices and/or systems according to embodiments of the inventive concepts will be or become apparent to one with skill in the art upon review of the following drawings and detailed description. It is intended that all such additional devices and/or systems be included within this description, be within the scope of the present inventive concepts, and be protected by the accompanying claims. Moreover, it is intended that all embodiments disclosed herein can be implemented separately or combined in any way and/or combination.

BRIEF DESCRIPTION OF DRAWINGS

FIG. 7A illustrates structures of the different transmitters that are described with respect to FIG. 6, according to various embodiments of the present inventive concepts.

DESCRIPTION OF EMBODIMENTS

Figure 1:
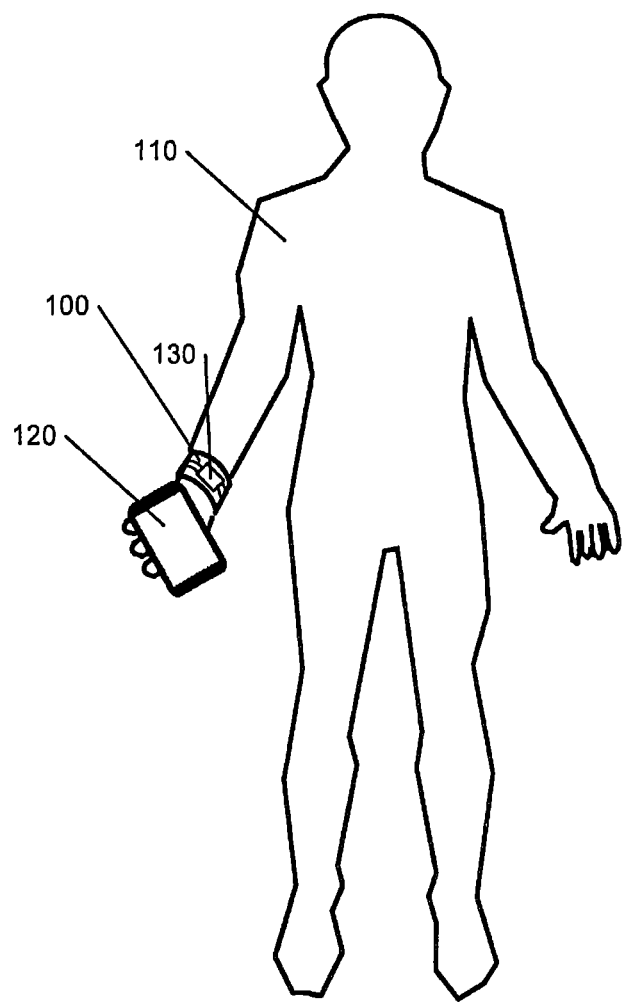
FIG. 1 is a schematic illustration of a wearable wireless electronic device and another wireless electronic device that can communicate with each other through the body of a human user, according to various embodiments of the present inventive concepts.

The present inventive concepts now will be described more fully with reference to the accompanying drawings, in which embodiments of the inventive concepts are shown. However, the present application should not be construed as limited to the embodiments set forth herein. Rather, these embodiments are provided so that this disclosure will be thorough and complete, and to fully convey the scope of the embodiments to those skilled in the art. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, steps, operations, elements, and/or components, but do not preclude the presence or addition of one or more other features, steps, operations, elements, components, and/or groups thereof.

It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

Spatially relative terms, such as "above," "below," "upper," "lower," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly-formal sense unless expressly so defined herein. Moreover, the term "about," as described herein, means that the recited number or value can vary by up to +/−25%.

Although some communications can be provided through a human body rather than through the air, such communications through the human body may be relatively weak and unreliable. Various embodiments of the wearable wireless electronic devices described herein, however, may improve the performance of intra-body communications by using a transmitter including electrodes that extend at least partially around the arm of the body. The transmitter may thus provide an increased contact area between the electrodes and the body, which may increase a voltage of signals transmitted from the transmitter of the wearable wireless electronic device to another wireless electronic device that is held by the user or is otherwise on or very close to the user's body.

Referring now to FIG. 1, a schematic diagram illustrates a wearable wireless electronic device 100 and another wireless electronic device 120 that can communicate with each other through the body of a human user 110, according to various embodiments of the present inventive concepts. The user 110 is a user of both the wearable wireless electronic device 100 and the other wireless electronic device 120. The wearable wireless electronic device 100 may be a wristband, a watch (e.g., a smart watch), or an armband that includes a transmitter 130 (e.g., antenna transmitter) that is configured to provide communications through the body of the user 110 to the other wireless electronic device 120. In particular, the transmitter 130 is configured to provide communications through the body of the user 110 to the other wireless electronic device 120 when the wearable wireless electronic device 100 is worn by the user 110 and when the other wireless electronic device 120 is on or adjacent the body of the user 110. For example, the wearable wireless electronic device 100 may be wrapped partially or completely around a limb of the user 110, or otherwise attached to the user 110, and the other wireless electronic device 120 may contemporaneously be held by a hand of the user 110 or be in a pocket of clothing worn by the user 110.

In some embodiments, the other wireless electronic device 120 may be a mobile telephone, a tablet computer, or any other wireless electronic device that is configured to receive communications from the wearable wireless electronic device 100 through the body of the user 110. For example, the other wireless electronic device 120 may be a mobile telephone that is held by the user 110 or is in a pants pocket of the user 110. As an example, the mobile telephone may be separated from the wearable wireless electronic device 100 by about 220.0 millimeters (mm) when the wearable wireless electronic device 100 is a wristband (or a watch) that the user 110 wears on a wrist that is adjacent a hand that is holding the mobile telephone, as illustrated in FIG. 1. Moreover, if the mobile telephone is separated from the body of the user 110 by much more than a pants pocket (e.g., if the user 110 places the mobile telephone on a nearby table), then communications through the body of the user 110 may not be received by the mobile telephone.

Figure 2:
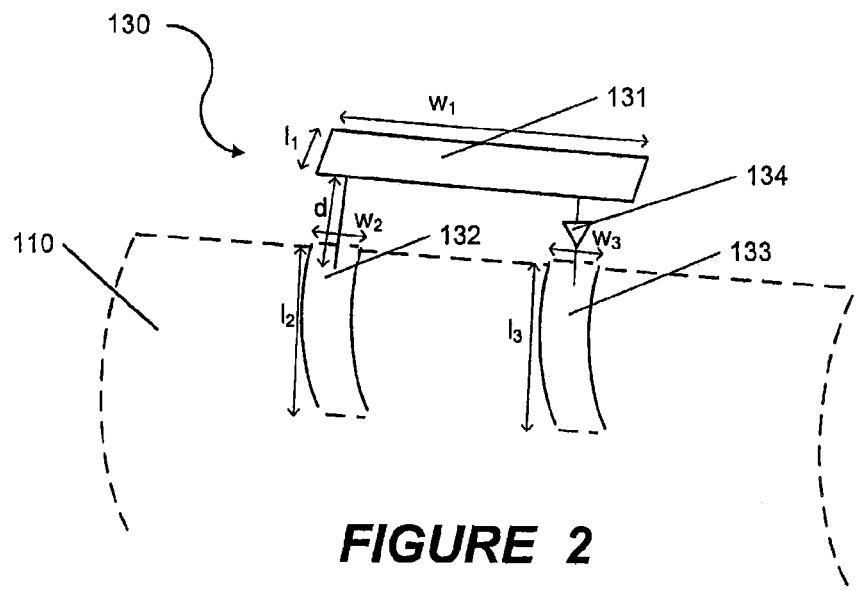
FIG. 2 illustrates a diagram of a transmitter of the wearable wireless electronic device, according to various embodiments of the present inventive concepts.

Referring now to FIG. 2, a diagram of the transmitter 130 of the wearable wireless electronic device 100 is provided, according to various embodiments of the present inventive concepts. In particular, the transmitter 130 may include a conductive material 131 that may be referred to herein as a ground plane, conductive surface, a conductive layer, a conductive sheet, or a conductive plate. The transmitter 130 may also include first and second electrodes 132, 133 that are spaced apart (e.g., horizontally spaced part) from each other. Respective top surfaces of the first and second electrodes 132, 133 may be coplanar. Moreover, respective bottom surfaces of the first and second electrodes 132, 133 may be coplanar. The conductive material 131 may overlap (e.g., may be vertically spaced apart from) the first and second electrodes 132, 133. In particular, the first and second electrodes 132, 133 and the overlapping conductive material 131 may have a distance d therebetween that may include a gap (e.g., an air gap or other type of void) or a dielectric material. The distance d may be, for example, about 10.0 mm.

The first and second electrodes 132, 133 of the transmitter 130 of the wearable wireless electronic device 100 may be configured to be electrically coupled to the conductive material 131. For example, the first and second electrodes 132, 133 may be arranged/positioned such that when a voltage is applied to the transmitter 130 (e.g., applied to and/or by the conductive material 131), the first and second electrodes 132, 133 provide an electric field that can be imposed on the body of the user 110. A processor circuit (e.g., the processor 163 illustrated in FIG. 3) and/or other circuitry of the wearable wireless electronic device 100 may be used to apply the voltage to the transmitter 130. Moreover, because the transmitter 130 may be worn by the user 110 in a wristband, watch, or armband, the transmitter 130 may be referred to as a user-wearable transmitter.

Portions of the first and second electrodes 132, 133 may be curved such that the first and second electrodes 132, 133 wrap partially or completely around a limb of the body of the user 110. For example, the first and second electrodes 132, 133 may each have one or more curves (e.g., rigid curves/bends or otherwise non-planar portions) regardless of whether the user 110 is wearing the wireless electronic device 100. Additionally or alternatively, the first and second electrodes 132, 133 may include a flexible material such that the first and second electrodes 132, 133 contour to the shape of a limb of the body of the user 110. In other words, the first and second electrodes 132, 133 may be inherently curved at preexisting curved portions thereof and/or may be curved at flexible portions thereof when the wearable wireless electronic device 100 is worn by the user 110. Accordingly, by preexisting curved portions of the first and second electrodes 132, 133 and/or by flexible portions of the first and second electrodes 132, 133, the first and second electrodes 132, 133 are configured to have curved portions thereof when the wearable wireless electronic device 100 is worn on a limb of the body of the user 110.

The first and second electrodes 132, 133 may be respective conductive plates. For example, in some embodiments, the conductive material 131 and the first and second electrodes 132, 133 may be respective metal plates. The metal plates of the first and second electrodes 132, 133, however, may each include one or more non-planar (e.g., curved/bent) portions when the wearable wireless electronic device 100 is worn by the user 110. The metal plate of the conductive material 131, on the other hand, be substantially planar and/or many not extend to wrap around more than one side (e.g., a top or bottom) of a limb of the body of the user 110. Specifically, the conductive material 131 may have a shorter length $l_1$ than respective lengths $l_2$, $l_3$ of either of the first and second electrodes 132, 133. As an example, the first and second electrodes 132, 133 may each be at least 25% longer than the conductive material 131. In some embodiments, the first and second electrodes 132, 133 may each be at least 50% longer than the conductive material 131. Moreover, if the first and second electrodes 132, 133 extend continuously around a limb of the body of the user 110 when the wearable wireless electronic device 100 is worn on the limb of the body of the user 110, then the first and second electrodes 132, 133 may each be at least double the length $l_1$ of the conductive material 131.

The transmitter 130 may transmit communications through the body of the user 110 by imposing an electric field on the body. In particular, the first and second electrodes 132, 133 may be configured to transmit communications through the body of the user 110 by imposing an electric field on the body. Moreover, the first and second electrodes 132, 133 may be configured to impose the electric field such that the electric field extends along a length (e.g., in a direction of the widths $w_1$-$w_3$) of a limb of the body of the user 110 rather than merely radiating the electric field orthogonally (e.g., in a direction of the distance d) to a surface of the limb on which the wearable wireless electronic device 100 is worn. Specifically, the limb of the of the user 110 provides the transmission medium along the length of the limb for the communications from the transmitter 130 to the other wireless electronic device 120. In particular, conductive fluid, tissues (e.g., blood vessels, internal tissue, skin, etc.) in/of the body of the user 110 may be used as a communications channel. Moreover, the structure of the first and second electrodes 132, 133 may improve transmission of the communications via the limb by imposing an electric field that extends along the length of the limb (e.g., extends in parallel with the limb rather than merely perpendicularly to the limb).

As described herein, the first and second electrodes 132, 133 may have longer respective lengths $l_2$, $l_3$ than the length $l_1$ of the conductive material 131. In particular, the first and second electrodes 132, 133 may extend to provide respective partial metal rings around a limb of the user 110. For example, the first and second electrodes 132, 133 may extend around a majority of a circumference of a limb of the user 110 when the wearable wireless electronic device 100 is worn by the user 110 on the limb (e.g., on a wrist or other portion of an arm of the user 110). Moreover, in some embodiments, the first and second electrodes 132, 133 may provide respective first and second metal rings that extend continuously around a circumference of a limb of the user 110 when the wearable wireless electronic device 100 is worn by the user 110 on the limb.

Referring still to FIG. 2, the first and second electrodes 132, 133 may have respective widths $w_2$ and $w_3$ that may be narrower than a width $w_1$ of the conductive material 131. Moreover, one of the first and second electrodes 132, 133 may be electrically shorted to the conductive material 131, and the other one of the first and second electrodes 132, 133 may be connected to the conductive material 131 via an antenna feed 134. Electrically shorting one of the first and second electrodes 132, 133 to the conductive material 131 may help to impose an electric field onto the body of the user 110 rather than radiating into the air.

Although the width $w_1$ of the conductive material 131 is illustrated in FIG. 2 as being a longer distance than the length $l_1$ of the conductive material 131, the width $w_1$ of the conductive material 131 may, in some embodiments, be a shorter distance than the length $l_1$ of the conductive material 131. For example, the width $w_1$ of the conductive material 131 may be about 30.0 mm and the length $l_1$ of the conductive material 131 may be about 80.0 mm.

Figure 3:
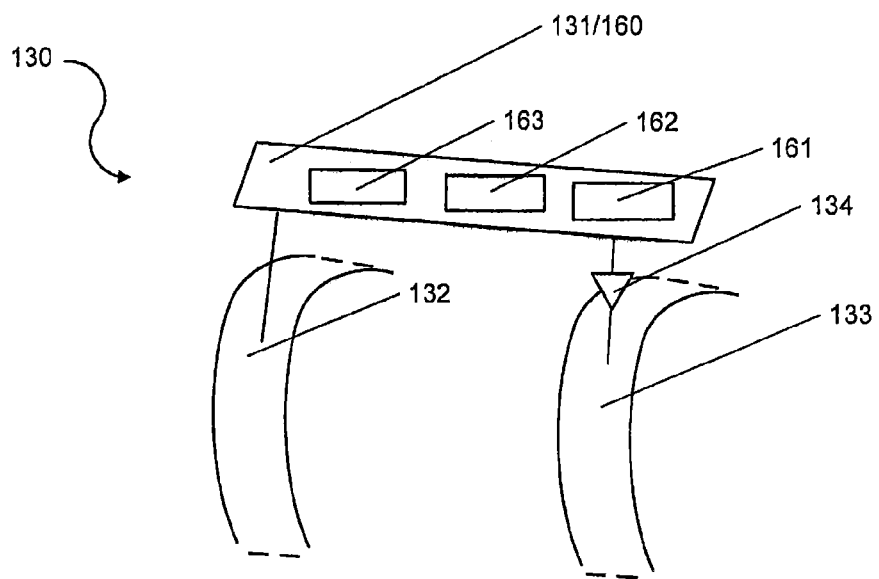
FIG. 3 illustrates a diagram of components/circuits that may be on/integrated with the conductive material of the transmitter of the wearable wireless electronic device, according to various embodiments of the present inventive concepts.

Referring now to FIG. 3, various components/circuits may be on/integrated with the conductive material 131, according to various embodiments of the present inventive concepts. For example, the wearable wireless electronic device 100 may include a matching network 161 that is on the conductive material 131 and is coupled to at least one of the first and second electrodes 132, 133. As an example, the matching network 161 may include a capacitor and an inductor.

Referring still to FIG. 3, a transceiver circuit 162 may be on the conductive material 131 of the wearable wireless electronic device 100. In some embodiments, the transceiver circuit 162, and/or the matching network 161, may be on a Printed Circuit Board (PCB) 160 that includes/provides the conductive material 131. In other words, the conductive material 131 may be a ground plane of the PCB 160.

The transceiver circuit 162 may be configured to electrically couple the conductive material 131 to the first and second electrodes 132, 133 to transmit BCC signals. For example, a transmitter portion of the transceiver circuit 162, in operational cooperation with a processor 163 of the wearable wireless electronic device 100, may convert information, which is to be transmitted by the wearable wireless electronic device 100, into electromagnetic signals suitable for communication to the other wireless electronic device 120. Moreover, the transceiver circuit 162 may supply signals to the transmitter 130 of the wearable wireless electronic device 100 via the antenna feed 134. Optionally, a receiver portion of the transceiver circuit 162 (or of a separate transceiver circuit) may demodulate electromagnetic signals, which may be received (in some embodiments) by the wearable wireless electronic device 100 from the other wireless electronic device 120 to provide the information contained in the signals in a format understandable by the processor 163 of the wearable wireless electronic device 100. The transceiver circuit 162 may include an amplifier. Moreover, in some embodiments, the processor 163 may be configured to measure a communications channel (e.g., to measure signal quality, etc.) in/through the body of the user 110, and to responsively control modulation (e.g., modulation of transmit power, etc.) of the communications provided by the transmitter 130.

Figure 4:
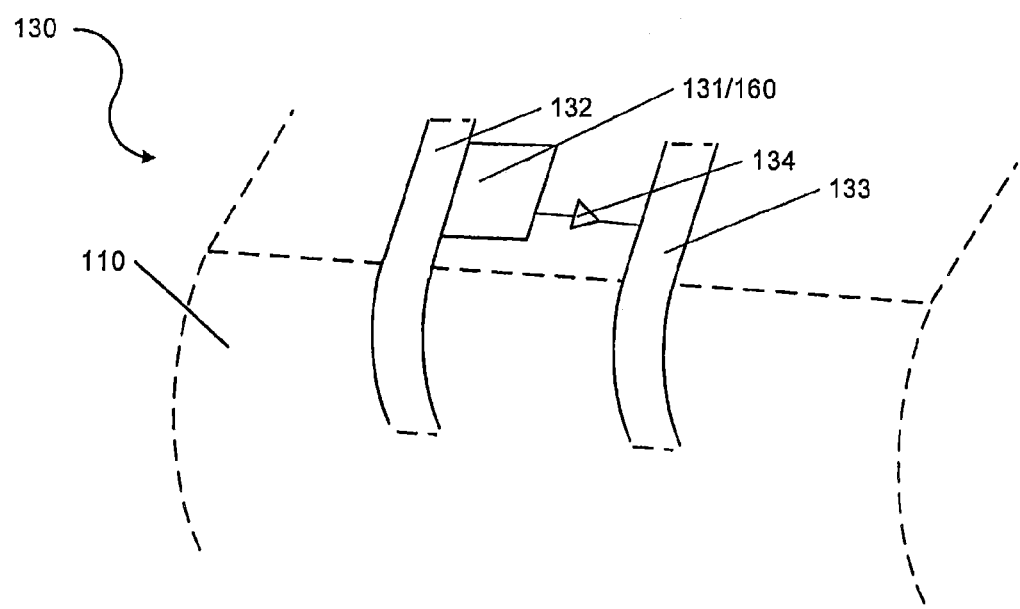
FIG. 4 illustrates a diagram of a transmitter in which first and second electrodes include respective surfaces that are coplanar with a surface of the conductive material, according to various embodiments of the present inventive concepts.

Referring now to FIG. 4, the conductive material 131/PCB 160 may be between the first and second electrodes 132, 133 rather than vertically spaced apart from and overlapping the first and second electrodes 132, 133, according to various embodiments of the present inventive concepts. For example, the conductive material 131, the first electrode 132, and the second electrode 133 may have respective top and/or bottom surfaces that are substantially coplanar. Moreover, as described herein, a portion of one of the first and second electrodes 132, 133 may be electrically shorted to the conductive material 131, and the other one of the first and second electrodes 132, 133 may be connected to the conductive material 131 via an antenna feed 134. In some embodiments, the portion of the one of the first and second electrodes 132, 133 that is electrically shorted to the conductive material 131 may be closer to (e.g., immediately adjacent) the conductive material 131 than other one of the first and second electrodes 132, 133 is to the conductive material 131. In particular, the other one of the first and second electrodes 132, 133 may be spaced apart from the conductive material 131 to provide room for the antenna feed 134 therebetween.

The communications that are provided by the transmitter 130 of the wearable wireless electronic device 100 may be body-coupled communications (e.g., communications that are intended for/constrained to conductive pathways within the body). Body-Coupled Communication (BCC) transmissions transmit data through a human body. In other words, in contrast with Bluetooth, Wi-Fi, cellular, Near-Field Communication (NFC), or Radio-Frequency Identification (RFID) transmissions, little or no data of BCC transmissions may transmit from the transmitter 130 through the air (or radiate from the body to transmit through the air). Accordingly, using BCC transmissions through the body of the user 110 may increase the security (e.g., by protecting against interception by third-party devices) of transmitted information, in comparison with transmissions that are primarily or exclusively through the air.

Moreover, BCC transmissions, in comparison with transmissions that are primarily or exclusively through the air, may reduce power consumption by the wearable wireless electronic device 100 and the other wireless electronic device 120. Accordingly, BCC technology may be advantageous for intra-body communications via wearable devices such as the wearable wireless electronic device 100.

In particular, the transmitter 130 of the wearable wireless electronic device 100 may be configured to transmit communications through the body of the user 110, using BCC technology. Specifically, the first and second electrodes 132, 133 of the transmitter 130 may be configured to transmit non-Bluetooth, non-Wi-Fi, non-cellular, non-NFC, and/or non-RFID communications through the body of the user 110 wearing the wearable wireless electronic device 100 to the other wireless electronic device 120. As an example, the first and second electrodes 132, 133 of the transmitter 130 may be configured to use frequencies between about 100.0 kilohertz (kHz) and 100.0 Megahertz (MHz) to transmit communications through the body of the user 110. For example, BCC signals at about 10.0-20.0 MHz may provide a well-controlled communication link in a channel provided by the body of the user 110, with minimal or no signal radiation from the body.

The data transmitted using the BCC transmissions may be fitness/health data for the user 110 that is determined/measured by the wearable wireless electronic device 100, but is not limited to such fitness health data. For example, the data may be any type of data that can be received by the other wireless electronic device 120 and subsequently stored therein, forwarded to yet another wireless electronic device or a server/cloud, and/or presented to the user 110 via a user interface of the other wireless electronic device 120. Moreover, the wearable wireless electronic device 100 may include one or more among various types of sensors that can detect/provide information regarding the body of the user 110 and/or information regarding devices/environments external to the body of the user 110.

In some embodiments, the wearable wireless electronic device 100 may transmit BCC signals to identify itself to the other wireless electronic device 120 (and/or to additional wireless electronic devices on the body of the user 110). Accordingly, BCC signals may be used by devices on the body of the user 110 to identify each other. After identifying each other using BCC signals, the devices can set up wireless communications through the air. For example, after the other wireless electronic device 120 identifies the wearable wireless electronic device 100 based on BCC signals transmitted by the wearable wireless electronic device 100, the other wireless electronic device 120 and the wearable wireless electronic device 100 may set up communications using Bluetooth, Wi-Fi, etc. Using BCC signals before setting up wireless communications through the air may reduce power consumption for the other wireless electronic device 120 and the wearable wireless electronic device 100. Moreover, regardless of whether the BCC signals are used before setting up wireless communications through the air or whether the BCC signals are used to transmit data exclusively, without using Bluetooth, Wi-Fi, etc. at all, between the other wireless electronic device 120 and the wearable wireless electronic device 100, using the BCC signals may be more secure than using wireless communications through the air.

Figure 5:
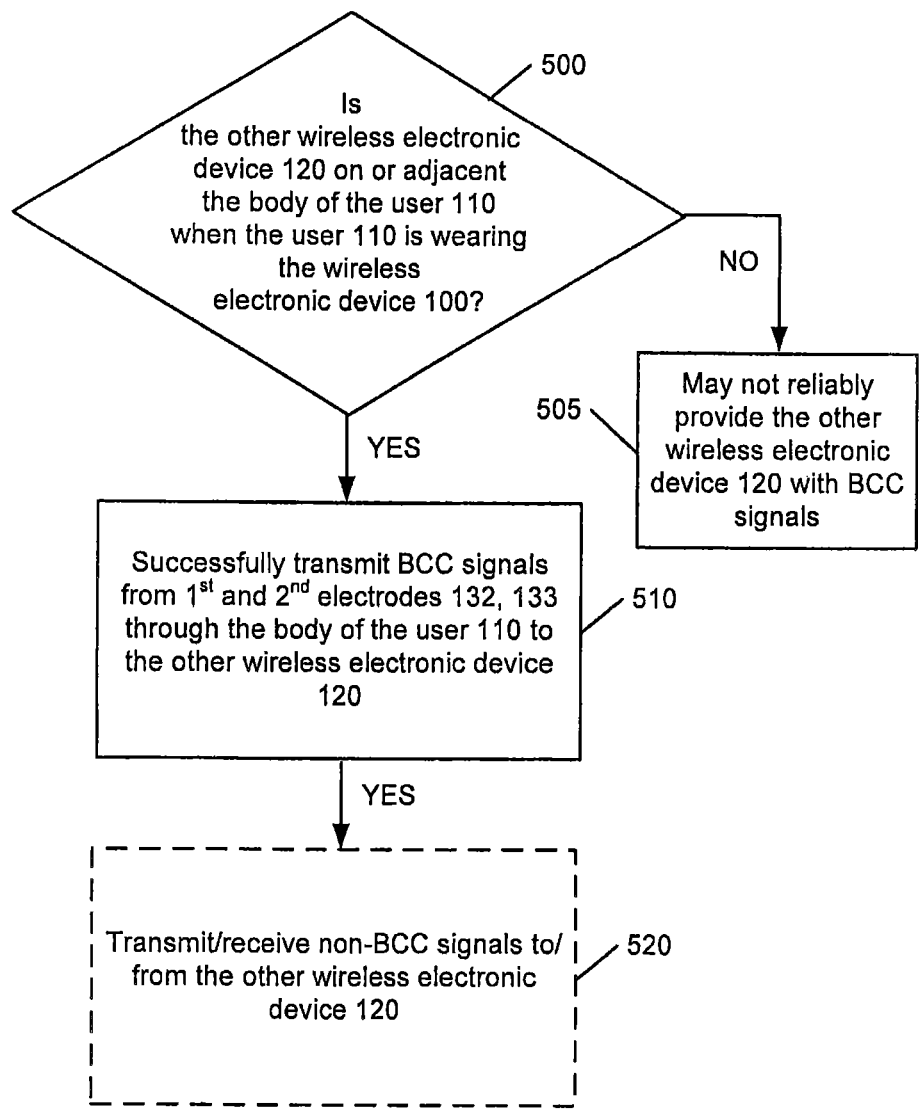
FIG. 5 illustrates a flowchart of operations of providing body-coupled communications between the wearable wireless electronic device and the other wireless electronic device, according to various embodiments of the present inventive concepts.

Referring now to FIG. 5, a flowchart illustrates operations of providing body-coupled communications between the wearable wireless electronic device 100 and the wireless electronic device 120, according to various embodiments of the present inventive concepts. In particular, the operations may include transmitting (Block 510) body-coupled communications from the first and second electrodes 132, 133 of the user-wearable transmitter 130 of the wearable wireless electronic device 100 through the body of the user 110 to the other wireless electronic device 120 that is on or adjacent the body (e.g., no more distant from the body than a pants pocket) of the user 110, when the user-wearable transmitter 130 is worn by the user 110. If, however, the other wireless electronic device 120 is not on or adjacent the body of the user 110 when the user-wearable transmitter 130 is worn by the user 110, then the wearable wireless electronic device 100 may not be able to reliably transmit BCC signals to the other wireless electronic device 120. (Blocks 500 and 505).

In some embodiments, operations in Block 510 of transmitting the body-coupled communications may include transmitting the body-coupled communications through an arm on which the user-wearable transmitter 130 is worn by the user 110, to the other wireless electronic device 120 (e.g., a mobile telephone) that is held by a hand connected to the arm. Performance of the body-coupled communications may improve when the wearable wireless electronic device 100 and the other wireless electronic device 120 are on the same side of the body of the user 110. For example, performance may improve when the wearable wireless electronic device 100 is worn on the user 110's right wrist and the other wireless electronic device 120 is held in the user 110's right hand, as illustrated in FIG. 1.

In particular, performance when the wearable wireless electronic device 100 is worn on the user 110's right wrist and the other wireless electronic device 120 is held in the user 110's right hand may be better (e.g., about 25.0-45.0 decibels (dB) better) than performance when the other wireless electronic device 120 is held in the user 110's other (left) hand or when the other wireless electronic device 120 is in the user 110's right pants pocket. Moreover, although FIG. 1 illustrates an example in which the wearable wireless electronic device 100 is worn on the user 110's arm, some embodiments may provide a wearable wireless electronic device 100 that can transmit BCC signals to the other wireless electronic device 120 when the wearable wireless electronic device 100 is worn on the user 110's leg or on the user 110's head (e.g., using a headband or headset).

Referring still to FIG. 5, operations of the wearable wireless electronic device 100 may optionally include transmitting and/or receiving (Block 520) non-BCC signals through the air to/from the other wireless electronic device 120. For example, the operations of Block 510 may be used to identify the wearable wireless electronic device 100 to the other wireless electronic device 120 via BCC signals, and the operations of Block 520 may subsequently/responsively be used to set up and/or provide Bluetooth or Wi-Fi communications between the wearable wireless electronic device 100 and the other wireless electronic device 120. Alternatively, the operations of Block 520 may be omitted, and communications between the wearable wireless electronic device 100 and the other wireless electronic device 120 may be exclusively body-coupled communications.

Figure 6:
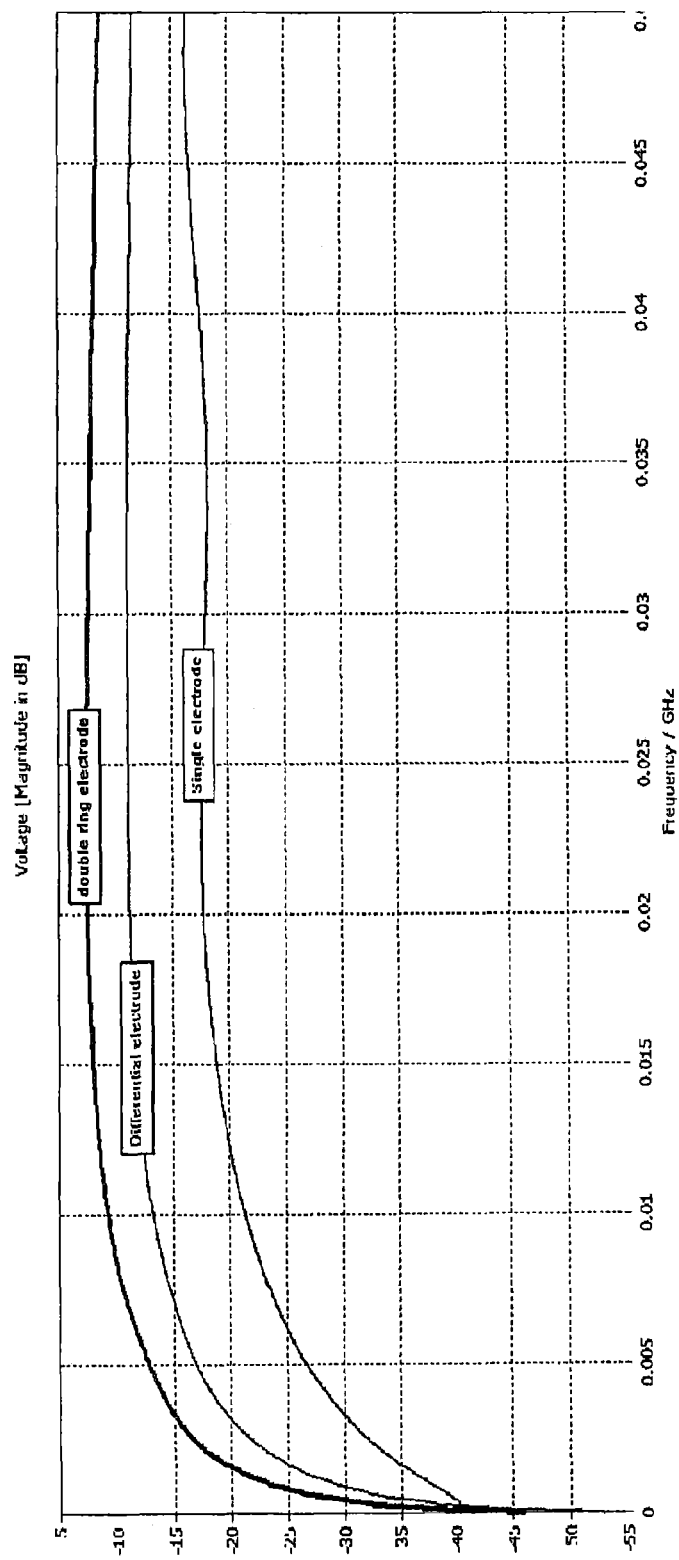
FIG. 6 illustrates a graph of voltages of body-coupled communication signals that are received by the other wireless electronic device, according to various embodiments of the present inventive concepts.

Referring now to FIG. 6, a graph illustrates voltages (in dB) of BCC signals that are received by the other wireless electronic device 120, according to various embodiments of the present inventive concepts. These voltages may be referred to as coupling voltages. In particular, FIG. 6 illustrates that a transmitter with a double-ring electrode may provide better performance than a transmitter with a differential electrode or a transmitter with a single electrode. The transmitter 130 of the wearable wireless electronic device 100 may be referred to as a transmitter with a double-ring electrode because the two electrodes 132, 133 of the transmitter 130 may provide at least partial rings around a wrist of the user 110. The single-electrode transmitter has only one electrode, and that sole electrode does not provide at least a partial ring around a wrist of the user 110. Moreover, although the differential-electrode transmitter has two electrodes, neither of the two electrodes provides at least a partial ring around a wrist of the user 110. FIG. 6 illustrates that the transmitter 130, with its double-ring electrode structure, can increase the voltage of BCC signals received by the other wireless electronic device 120 by about 4.0 dB in comparison with a differential-electrode transmitter and by about 10.0 db in comparison with a single-electrode transmitter.

Figure 7B:
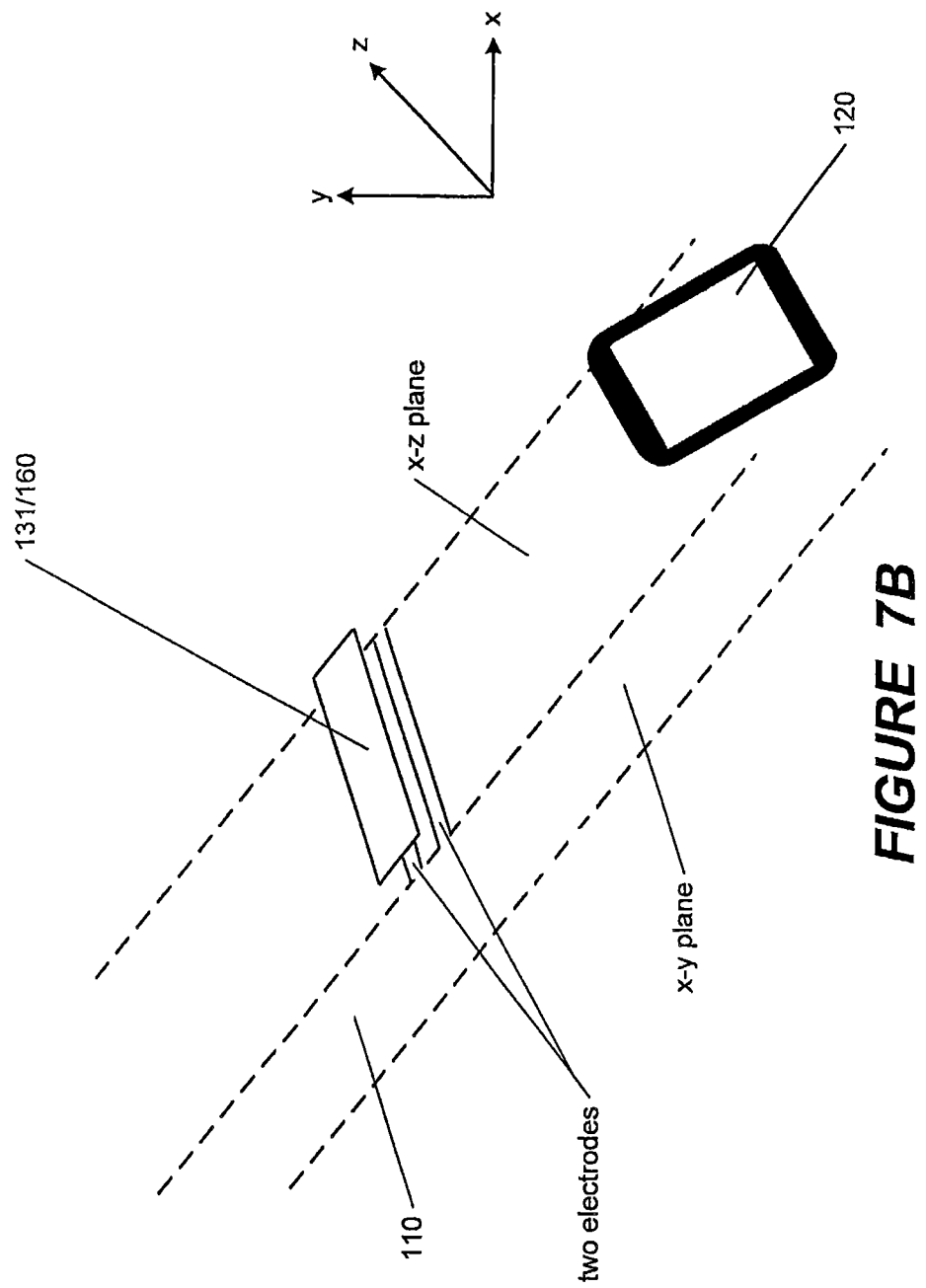
FIG. 7B illustrates structures of the different transmitters that are described with respect to FIG. 6, according to various embodiments of the present inventive concepts.
Figure 7C:
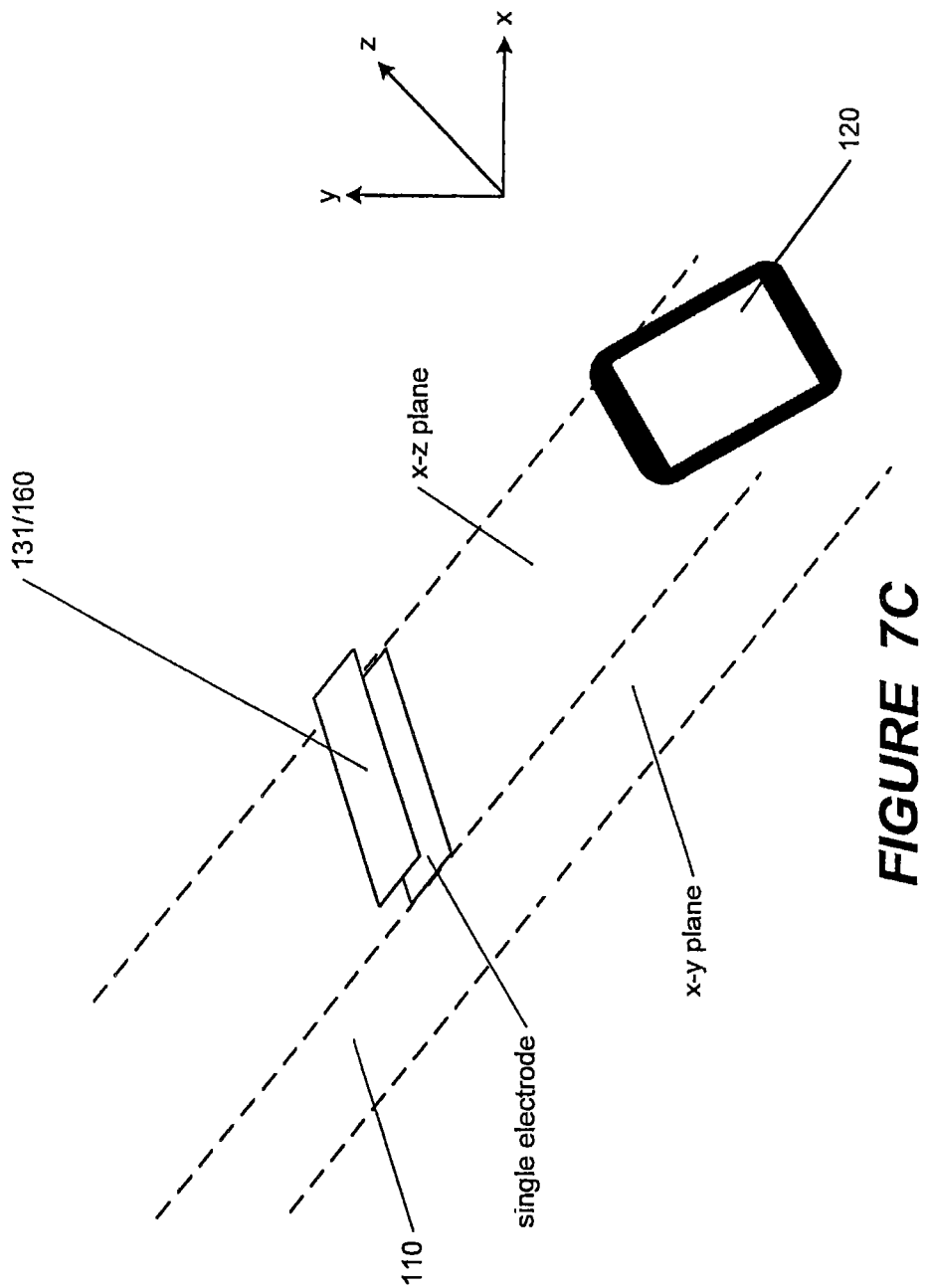
FIG. 7C illustrates structures of the different transmitters that are described with respect to FIG. 6, according to various embodiments of the present inventive concepts.

Referring now to FIGS. 7A-7C, structures of the different types of transmitters described with respect to FIG. 6 are illustrated, according to various embodiments of the present inventive concepts. In particular, FIG. 7A illustrates a transmitter with the first and second electrodes 132, 133 (e.g., a double-ring-electrode transmitter), FIG. 7B illustrates a transmitter with a differential electrode (e.g., two electrodes), and FIG. 7C illustrates a transmitter with a single electrode. The transmitters of FIGS. 7A-7C are spaced apart from the other wireless electronic device 120 along the arm on the user 110. In particular, FIGS. 7A-7C illustrate models of the arm of the user 110 in which the other wireless electronic device 120 is held in a hand of the user 110. Specifically, the arm of the user 110 is modeled as a cuboid that includes, for example, faces in the x-y and x-z planes.

Figure 8A:
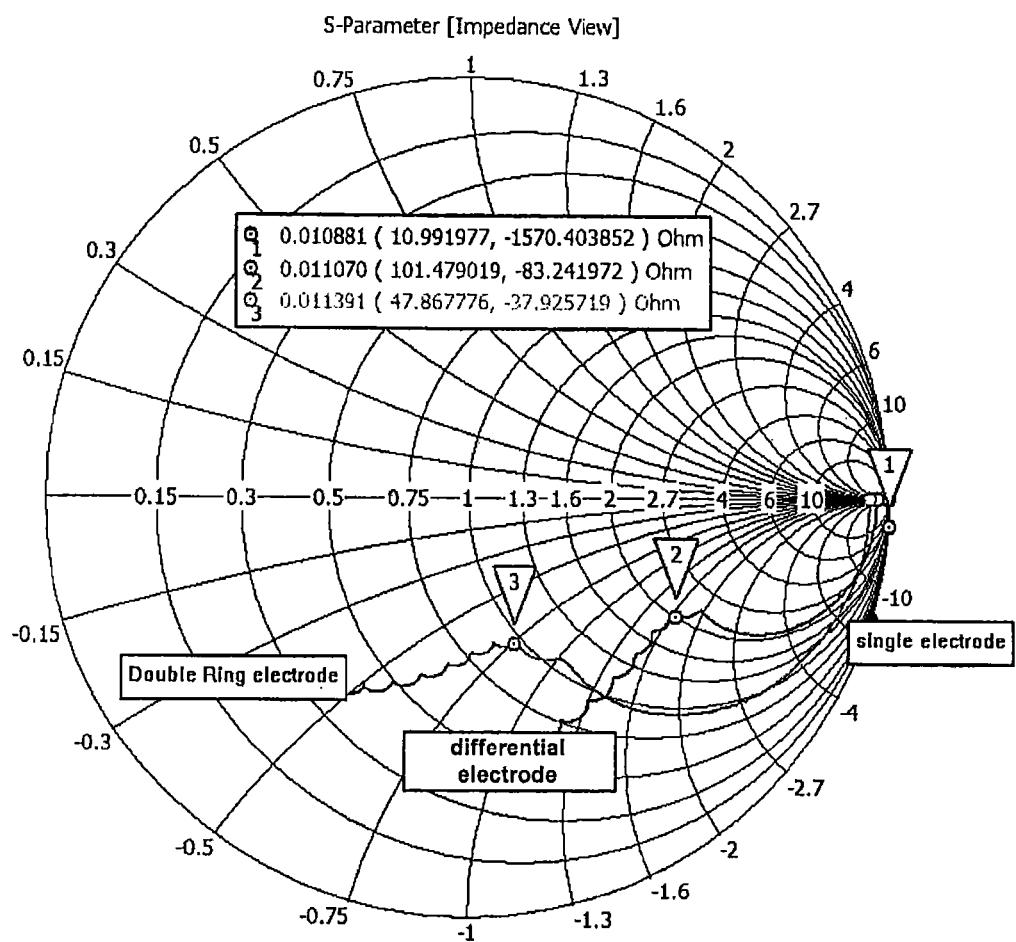
FIG. 8A illustrates S-parameters for the different transmitters that are described with respect to FIG. 6, according to various embodiments of the present inventive concepts.
Figure 8B:
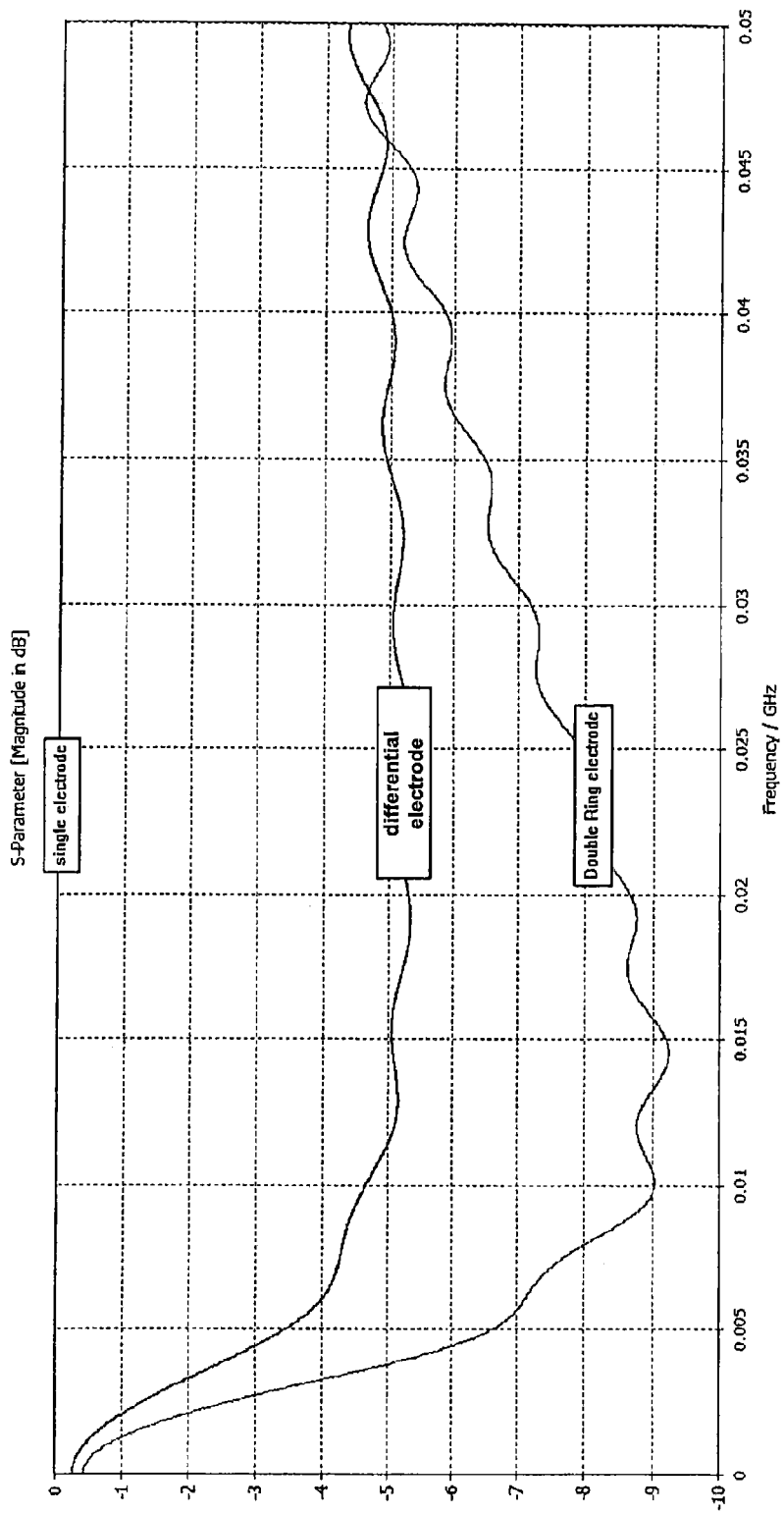
FIG. 8B illustrates S-parameters for the different transmitters that are described with respect to FIG. 6, according to various embodiments of the present inventive concepts.

Referring now to FIGS. 8A and 8B, S-parameters are illustrated for the different transmitters described with respect to FIG. 6, according to various embodiments of the present inventive concepts. In particular, the S-parameters of FIGS. 8A and 8B illustrate that more energy goes into the body of the user 110 when using a transmitter with a double-ring electrode.

Figure 9A:
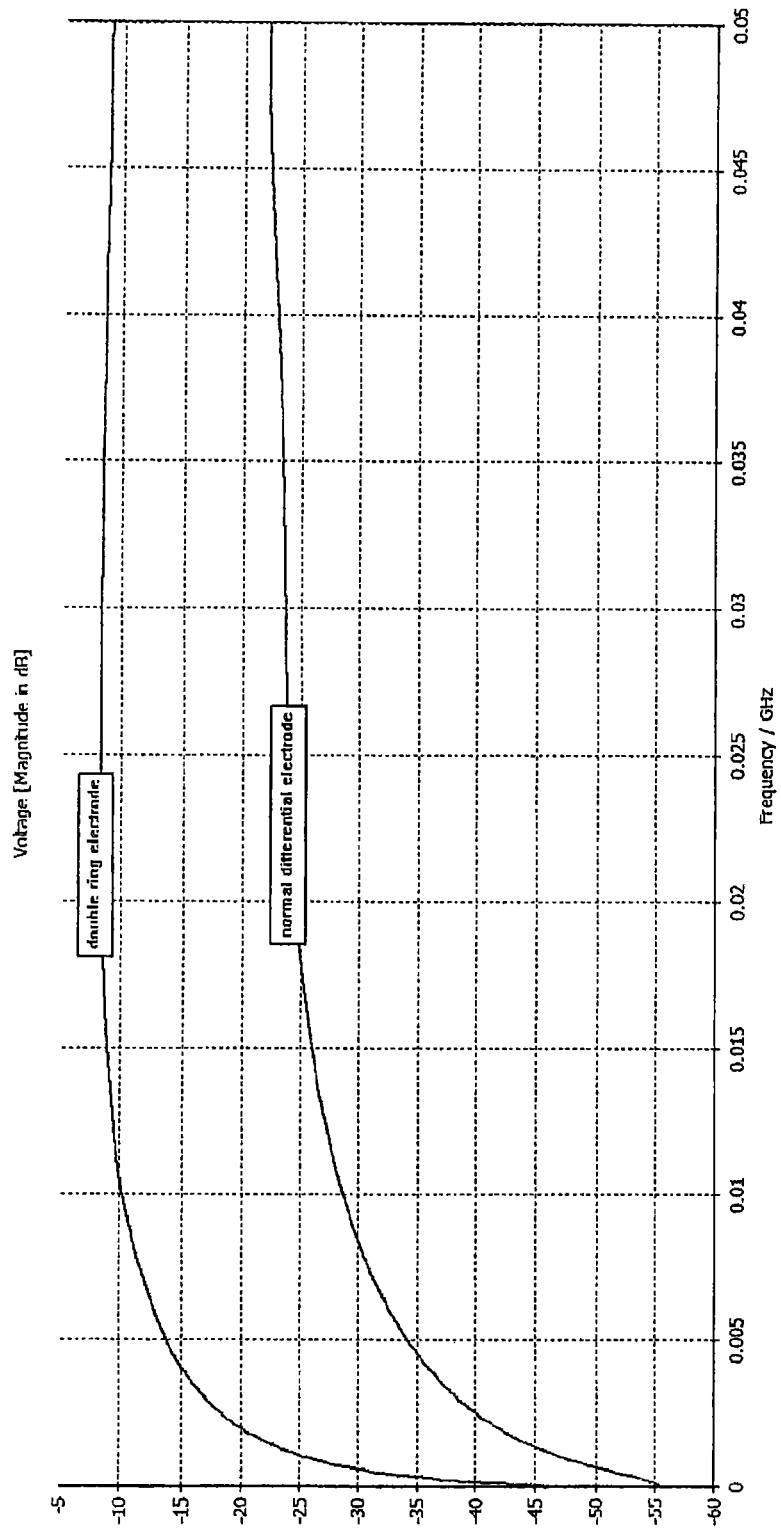
FIG. 9A illustrates graphs for a double-ring-electrode transmitter and a differential-electrode transmitter when a contact area is reduced, according to various embodiments of the present inventive concepts.
Figure 9B:
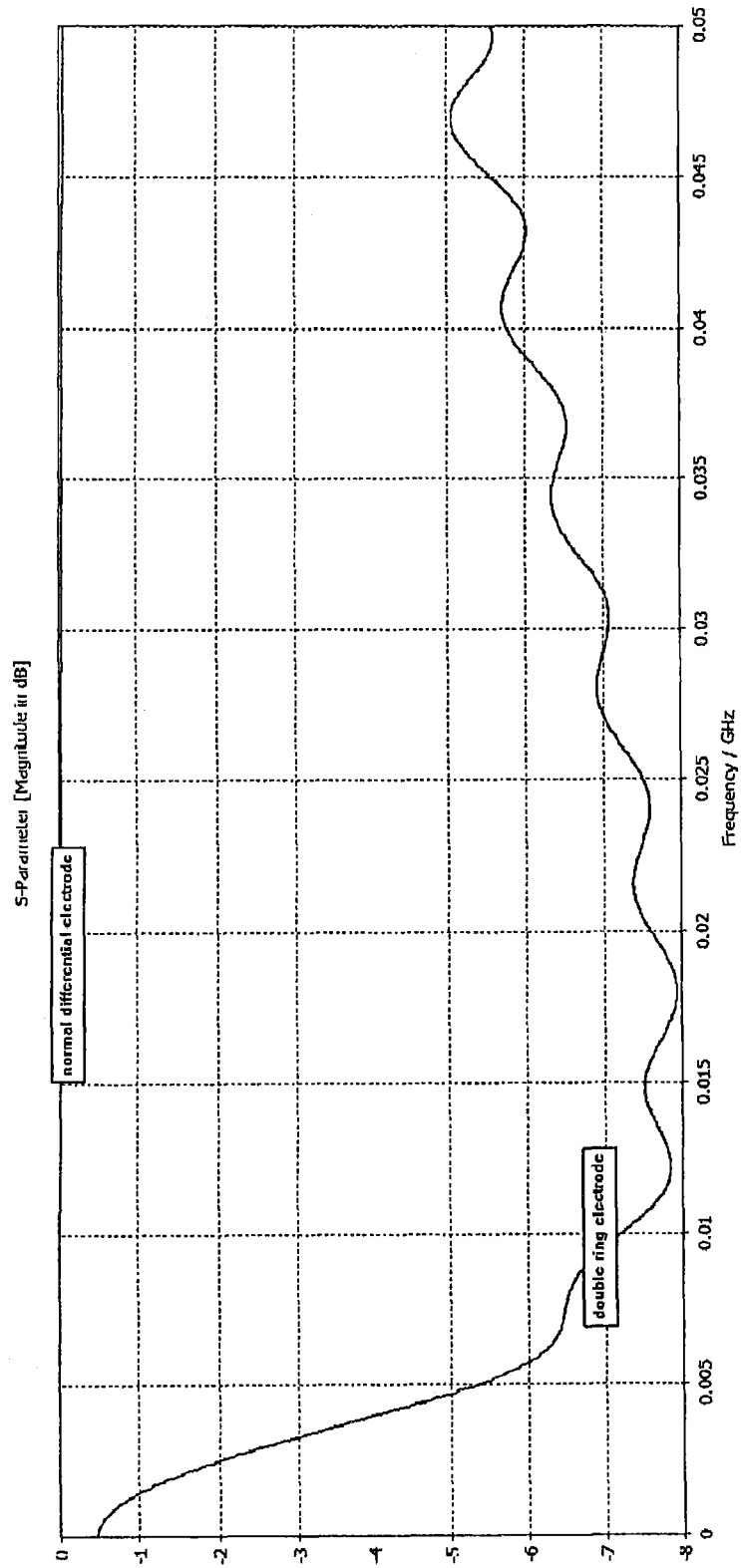
FIG. 9B illustrates graphs for a double-ring-electrode transmitter and a differential-electrode transmitter when a contact area is reduced, according to various embodiments of the present inventive concepts.

Referring now to FIGS. 9A and 9B, graphs of voltages (in dB) of BCC signals received by the other wireless electronic device 120 and S-parameters, respectively, are illustrated for a double-ring-electrode transmitter and a differential-electrode transmitter when a contact area is reduced, according to various embodiments of the present inventive concepts. In particular, FIGS. 9A and 9B illustrate performance when the planar (e.g., non-curved, non-extended) portions of the electrodes that are common to both types of transmitters are separated from the body of the user 110 by a small gap of about 2.0 mm. Specifically, FIGS. 9A and 9B illustrate that the double-ring-electrode transmitter is more resilient/robust to variations in body contact with the user 110, due to the larger touching/contact area provided by the curved/extended portions of the electrodes 132, 133. The differential-electrode transmitter, in contrast, may not be touching the body of the user 110 at all, and thus may provide performance that is about 17 dB worse, as illustrated in FIG. 9A. Moreover, FIG. 9B illustrates that the impedance matching of the differential-electrode transmitter is significantly worse than that of the double-ring-electrode transmitter, due to the untouched body. Accordingly, a double-ring-electrode transmitter (e.g., the transmitter 130) may provide a more reliable design.

In some embodiments, surfaces of the electrodes 132, 133 may be exposed to the body of the user 110. Alternatively, the wearable wireless electronic device 100 may include a material that covers the electrodes 132, 133. In particular, although using the transmitter 130 with the electrodes 132, 133 in direct contact with the body of the user 110 may provide better performance than using a cover that will intervene between the electrodes 132, 133 and the body, such a cover may optionally be used. For example, a wrist band (or a watch) that includes the transmitter 130 may provide rubber, silicone, or another material over the electrodes 132, 133. Accordingly, the electrodes 132, 133 of the transmitter 130 of the wearable wireless electronic device 100 may be exposed to the body of the user 110 or may optionally be covered.

Figure 10:
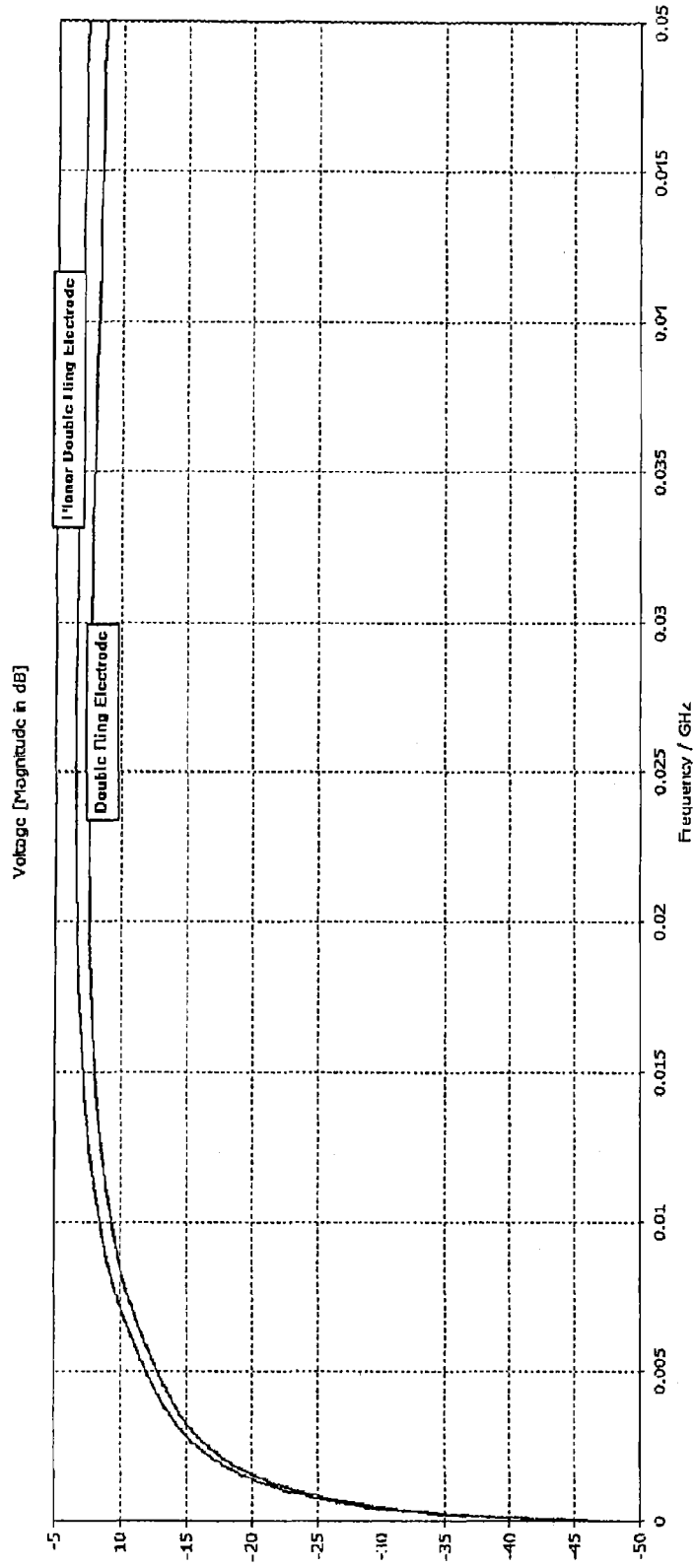
FIG. 10 illustrates a graph for a planar double-ring electrode and for the double-ring electrode that is described with respect to FIG. 6, according to various embodiments of the present inventive concepts.

Referring now to FIG. 10, a graph is provided that illustrates voltages (in dB) of BCC signals received by the other wireless electronic device 120 when using a transmitter with a planar double-ring electrode and when using a transmitter that has the double-ring electrode described with respect to FIG. 6, according to various embodiments of the present inventive concepts. The structure of the transmitter 130 illustrated in FIG. 4 may be referred to as a planar double-ring electrode because the conductive material 131/PCB 160 has a surface that is substantially coplanar with respective surfaces of the electrodes 132, 133. In other words, the conductive material 131 of the planar double-ring electrode is not elevated with respect to the electrodes 132, 133 (e.g., the distance d illustrated in FIG. 2 may be about zero (0.0) mm).

Moreover, the conductive material 131 of the planar double-ring electrode may be smaller than the conductive material 131 of the transmitter 130 illustrated in FIG. 2. Accordingly, the conductive material 131 of the planar double-ring electrode may include a smaller amount of metal, which may result in fewer losses and, thus, higher-voltage BCC signals. In other words, the planar double-ring electrode can impose a stronger electric field on the body of the user 110. For example, FIG. 10 illustrates that the planar double-ring electrode may provide higher-voltage BCC signals to the other wireless electronic device 120. The impedance matching performance of the planar double-ring electrode, however, may be about the same as that of the double-ring electrode described with respect to FIG. 6.

Figure 11A:
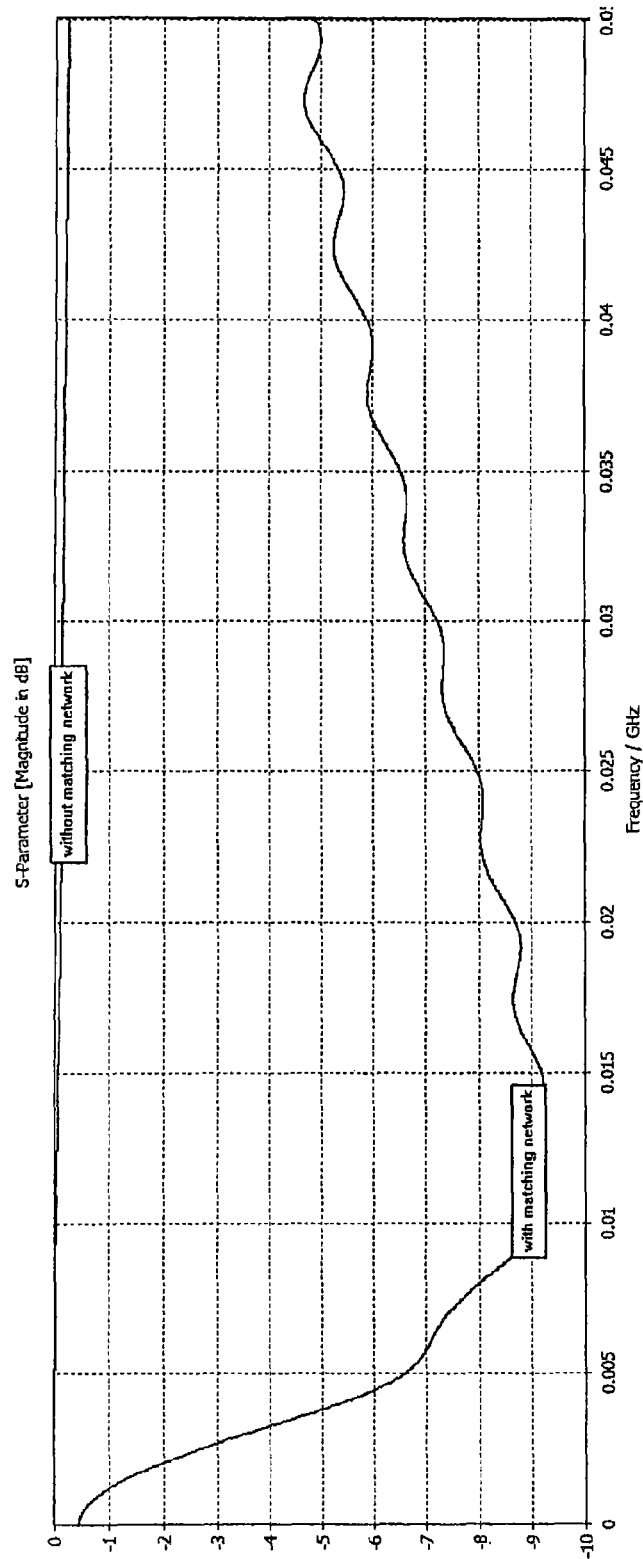
FIG. 11A illustrates graphs of S-parameters and voltages of body-coupled communication signals received by the other wireless electronic device when the wearable wireless electronic device includes a matching network, according to various embodiments of the present inventive concepts.
Figure 11B:
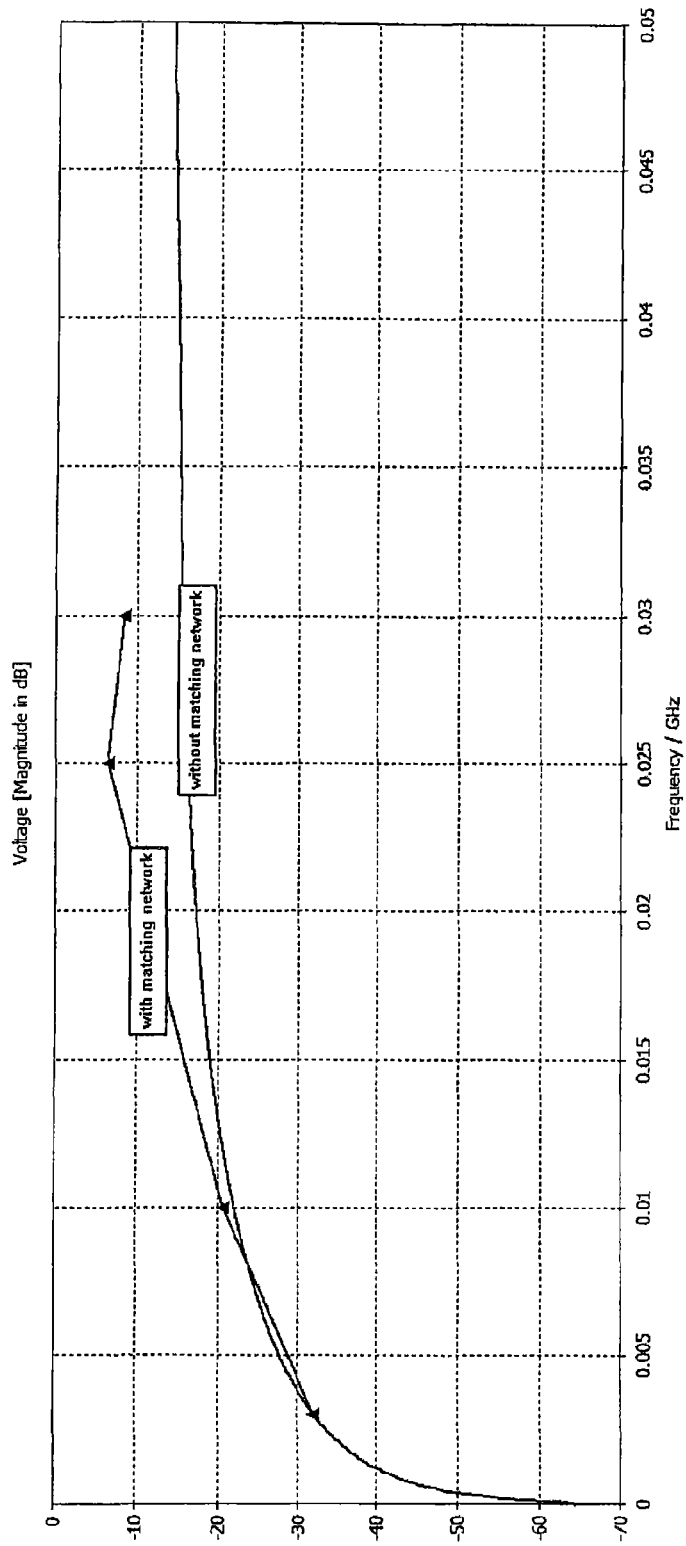
FIG. 11B illustrates graphs of S-parameters and voltages of body-coupled communication signals received by the other wireless electronic device when the wearable wireless electronic device includes a matching network, according to various embodiments of the present inventive concepts.

Referring now to FIGS. 11A and 11B, graphs of S-parameters and voltages (in dB) of BCC signals received by the other wireless electronic device 120, respectively, are illustrated for using the wearable wireless electronic device 100 (i) with and (ii) without the matching network 161, according to various embodiments of the present inventive concepts. In particular, FIGS. 11A and 11B both illustrate improved performance when the wearable wireless electronic device 100 includes the matching network 161. Specifically, the matching network 161 may improve performance when the electrodes 132, 133 do not directly contact the body of the user 110 at all. For example, the matching network 161 may improve performance when the electrodes 132, 133 are covered by a layer of clothing, a cover that is included as a part of the wearable wireless electronic device 100, or another material that intervenes between the electrodes 132, 133 and a surface of the body of the user 110.

Various embodiments described herein provide first and second electrodes 132, 133 that include curved/extended portions (e.g., partial/open or continuous/closed rings) that contact a greater area of the body of the user 110 than the differential electrode illustrated in FIG. 7B or the single electrode illustrated in FIG. 7C. The first and second electrodes 132, 133 may thus improve the performance of body-coupled communications. In particular, the increased contact/conductive area provided by the curved/extended portions of the first and second electrodes 132, 133 may increase a capacitance between the transmitter 130 and a surface of a limb of the body of the user 110 and, as a result, a larger electrical potential can be excited onto the body of the user 110, which may increase the voltage of signals received by the other wireless electronic device 120. Moreover, although two electrodes (the first and second electrodes 132, 133) are described herein as including respective curved/extended portions, some embodiments may provide a transmitter that includes a single electrode with a curved/extended portion, or a transmitter that includes three, four, or more electrodes with respective curved/extended portions.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed various embodiments and, although specific terms are employed, they are used in a generic and descriptive sense only and not for purposes of limitation.

The invention claimed is:

1. A wearable first wireless electronic device comprising:
first and second electrodes that are spaced apart from each other and that comprise first and second curved portions, respectively, when the wearable first wireless electronic device is worn by a user,
wherein the first and second electrodes are configured to transmit communications via the first and second curved portions through a human body of the user to a second wireless electronic device on or adjacent the human body of the user, when the wearable first wireless electronic device is worn by the user, and
wherein the wearable first wireless electronic device further comprises a processor configured to:
measure a communications channel through the human body of the user; and
control modulation of the communications that the first and second electrodes are configured to transmit through the human body of the user, in response to measuring the communications channel of the human body of the user.

2. The wearable wireless electronic device of claim 1, wherein the first and second electrodes are configured to transmit the communications through the human body of the user by imposing an electric field on the human body of the user.

3. The wearable wireless electronic device of claim 2, wherein the first and second electrodes are configured to impose the electric field such that the electric field extends along a length of a limb of the human body of the user when the wearable first wireless electronic device is worn by the user on the limb.

4. The wearable wireless electronic device of claim 3, wherein the limb of the human body of the user provides a transmission medium along the length of the limb for the communications from the wearable first wireless electronic device to the second wireless electronic device.

5. The wearable wireless electronic device of claim 1, wherein the first and second electrodes comprise first and second partial metal rings, respectively.

6. The wearable wireless electronic device of claim 5, wherein the first and second partial metal rings are configured to extend around a majority of a circumference of a limb of the human body of the user when the wearable first wireless electronic device is worn by the user.

7. The wearable wireless electronic device of claim 1, wherein the first and second electrodes comprise first and second metal rings, respectively, that extend continuously around a circumference of a limb of the human body of the user when the wearable first wireless electronic device is worn by the user.

8. The wearable wireless electronic device of claim 1,
wherein the wearable first wireless electronic device further comprises a conductive plate, and
wherein the first and second electrodes are configured to be electrically coupled to the conductive plate.

9. The wearable wireless electronic device of claim 8,
wherein the first electrode is electrically shorted to the conductive plate, and
wherein the second electrode is connected to the conductive plate via an antenna feed.

10. The wearable wireless electronic device of claim 8, further comprising a matching network that is on the conductive plate and is coupled to at least one of the first and second electrodes.

11. The wearable wireless electronic device of claim 8, wherein the conductive plate is between the first and second electrodes.

12. The wearable wireless electronic device of claim 11, wherein the conductive plate, the first electrode, and the second electrode comprise first, second, and third surfaces, respectively, that are substantially coplanar.

13. The wearable wireless electronic device of claim 12,
wherein a portion of the first electrode is immediately adjacent and electrically shorted to the conductive plate, and
wherein a portion of the second electrode is spaced apart from the conductive plate and connected to the conductive plate via an antenna feed.

14. The wearable wireless electronic device of claim 8, further comprising a transceiver circuit that is on the conductive plate and is configured to electrically couple the conductive plate to the first and second electrodes to transmit the communications.

15. The wearable wireless electronic device of claim 1,
wherein the communications that the first and second electrodes are configured to transmit through the human body of the user wearing the wearable first wireless electronic device to the second wireless electronic device comprise body-coupled communications using frequencies between about 100.0 kilohertz and 100.0 Megahertz, and
wherein the wearable first wireless electronic device further comprises a processor configured to:
measure signal quality through the human body of the user; and
control modulation of transmit power of the communications that the first and second electrodes are configured to transmit through the human body of the user, in response to measuring the signal quality through the human body of the user.

16. A wearable first wireless electronic device comprising:
first and second electrodes that are spaced apart from each other and that are configured to extend around at least a majority of a circumference of a limb of a human body of a user when the wearable first wireless electronic device is worn by the user on the limb, the first and second electrodes being configured to transmit communications through a transmission medium provided by a human body of the user to a second wireless electronic device on or adjacent the human body of the user; and
a processor configured to:
measure a communications channel through the human body of the user; and
control modulation of the communications that the first and second electrodes are configured to transmit through the human body of the user, in response to measuring the communications channel of the human body of the user.

17. The wearable wireless electronic device of claim 16,
wherein the wearable first wireless electronic device further comprises a conductive surface,
wherein the first and second electrodes are configured to be electrically coupled to the conductive surface,
wherein the second wireless electronic device comprises a mobile telephone,
wherein the first electrode is electrically shorted to the conductive surface,
wherein the second electrode is connected to the conductive surface via an antenna feed,
wherein the first and second electrodes are spaced apart from each other in a first direction,
wherein the first and second electrodes comprise first and second lengths, respectively, in a second and/or a third direction intersecting the first direction,
wherein the conductive surface comprises a third length that is shorter than each of the first and second lengths, and
wherein the communications that the first and second electrodes are configured to transmit through the transmission medium provided by the human body of the user wearing the wearable first wireless electronic device to the mobile telephone comprise body-coupled communications using frequencies between about 100.0 kilohertz and 100.0 Megahertz.

18. A method of providing body-coupled communications between a wearable first wireless electronic device and a second wireless electronic device, the method comprising:
transmitting the body-coupled communications from first and second electrodes of a transmitter of the wearable first wireless electronic device through a human body of a user to the second wireless electronic device that is on or adjacent the human body of the user, when the wearable first wireless electronic device is worn by the user;
measuring a communications channel through the human body of the user; and
controlling modulation of the body-coupled communications through the human body of the user, in response to measuring the communications channel of the human body of the user,
wherein the first and second electrodes extend around at least a majority of a circumference of a limb of the human body of the user when the wearable first wireless electronic device is worn by the user on the limb, and
wherein the first and second electrodes are spaced apart from each other.

19. The method of claim 18,
wherein the wearable first wireless electronic device further comprises a conductive surface,
wherein the first and second electrodes are configured to be electrically coupled to the conductive surface,
wherein the first electrode is electrically shorted to the conductive surface,
wherein the second electrode is connected to the conductive surface via an antenna feed, and
wherein transmitting the body-coupled communications comprises transmitting the body-coupled communications through a transmission medium provided by the human body of the user wearing the wearable first wireless electronic device to the second wireless electronic device using frequencies between about 100.0 kilohertz and 100.0 Megahertz.

20. The method of claim 19, wherein the second wireless electronic device comprises a mobile telephone, wherein the limb on which the wearable first wireless electronic device is worn by the user comprises an arm of the user, wherein the mobile telephone is held by a hand connected to the arm of the user, and wherein transmitting the body-coupled communications comprises transmitting the body-coupled communications through the arm on which the wearable first wireless electronic device is worn by the user to the mobile telephone that is held by the hand connected to the arm.

* * * * *